(No Model.) 2 Sheets—Sheet 1.

W. C. & D. R. SCHENCK.
COMBINED SULKY AND GANG PLOW.

No. 341,509. Patented May 11, 1886.

WITNESSES
Charles Weber.
N. S. Higdon.

INVENTORS:
W. C. Schenck and
D. R. Schenck.
By J. C. Higdon, Attorney (No Model.) 2 Sheets—Sheet 2.

W. C. & D. R. SCHENCK.
COMBINED SULKY AND GANG PLOW.

No. 341,509. Patented May 11, 1886.

WITNESSES
Charles Weber
M. H. Higdon.

INVENTORS:
W. C. Schenck and
D. R. Schenck.
By J. C. Higdon, Attorney

UNITED STATES PATENT OFFICE.

WILLIAM C. SCHENCK AND DANIEL R. SCHENCK, OF KANSAS CITY, MO.

COMBINED SULKY AND GANG PLOW.

SPECIFICATION forming part of Letters Patent No. 341,509, dated May 11, 1886.

Application filed September 11, 1885. Serial No. 176,759. (No model.)

*To all whom it may concern:*

Be it known that we, WILLIAM C. SCHENCK and DANIEL R. SCHENCK, of Kansas City, Jackson county, Missouri, have invented certain new and useful Improvements in Combined Sulky and Gang Plows, of which the following is a full, clear, and exact description, reference being had to the accompanying drawings, forming a part hereof.
The object of this invention is to promote efficiency and convenience in the use of sulky and gang plows.

The invention consists more particularly in a combined sulky and gang plow constructed with one or more plows connected with the axle carrying the tongue by a bail hinged to the axle in such a manner that the said tongue will not be affected by the movements of the said plow or plows.
The invention further consists in the devices and combination of devices hereinafter set forth, and pointed out in the claims.

Figure 1:
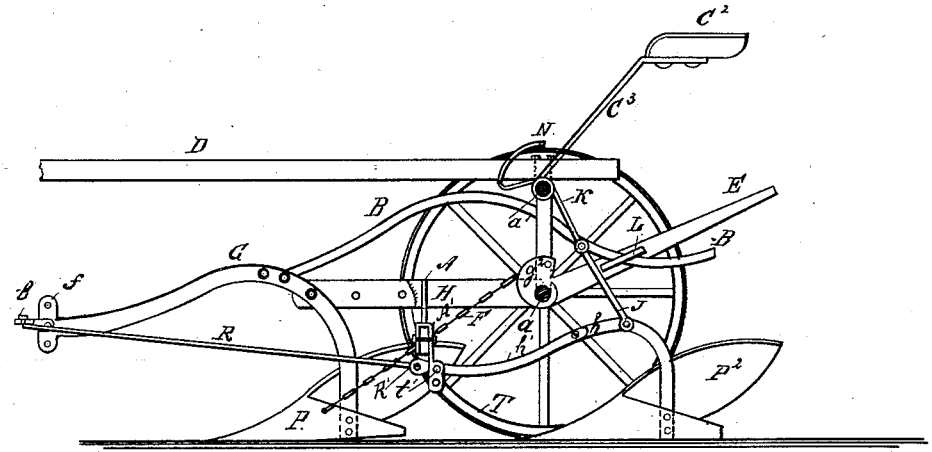
Figure 2:
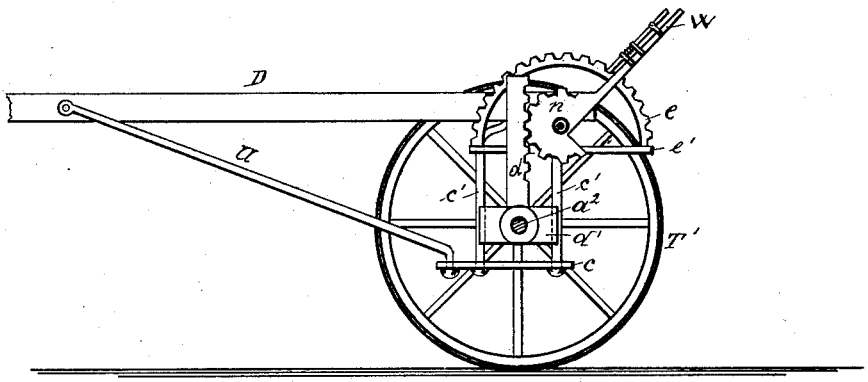
Figure 3:
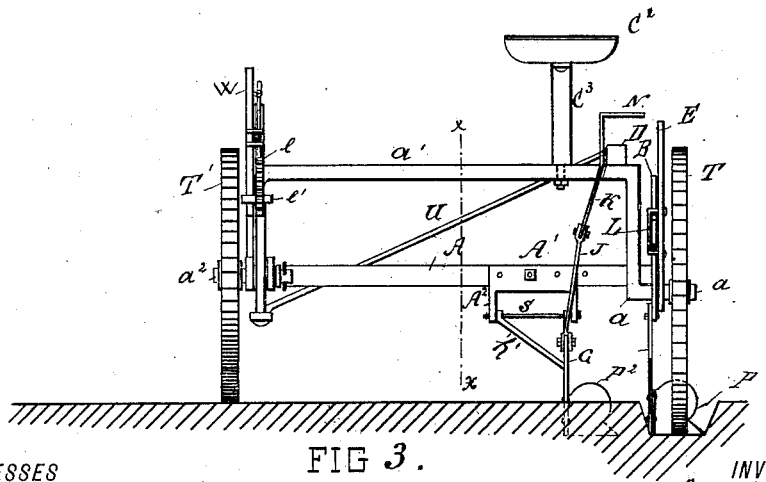
Figure 4:
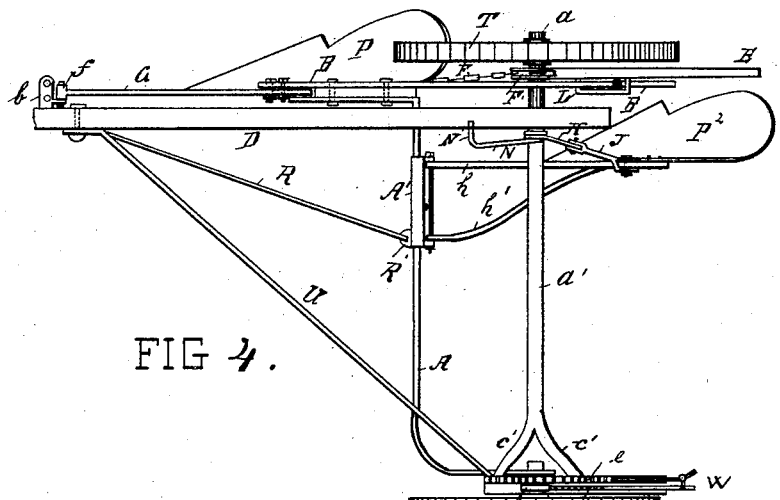
Figures 5, 6:
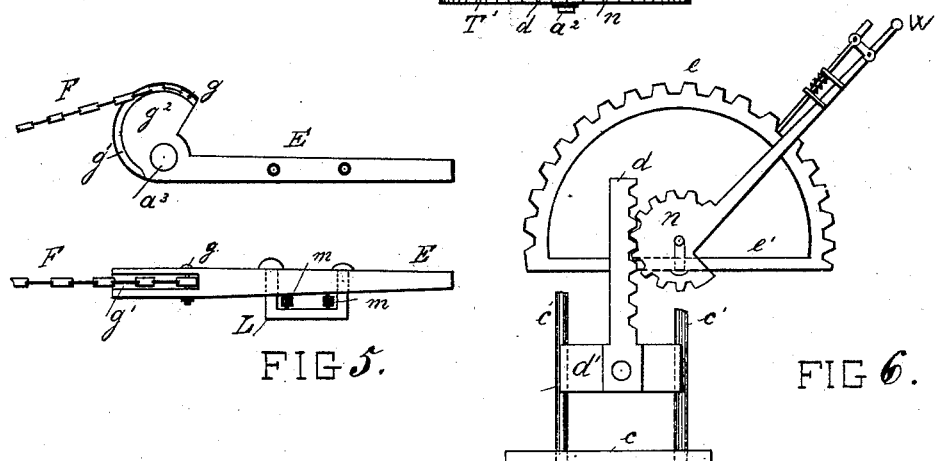
Figures 7, 8:
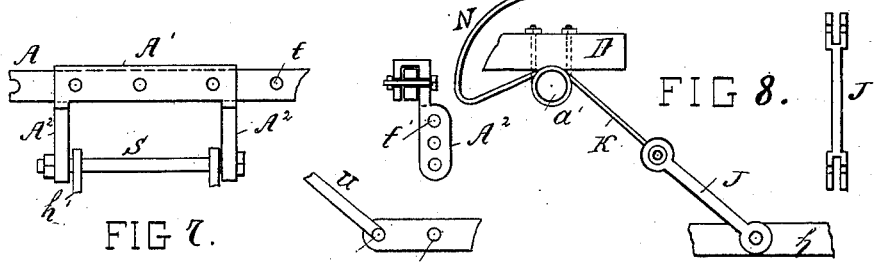

In the drawings, Figure 1 is a sectional elevation of my improved plow on line $x\,x$. Fig. 3, looking toward the furrow-wheel. Fig. 2 is a like view exhibiting the leveling devices in place. Fig. 3 is a rear elevation of the same. Fig. 4 is a plan view, and Figs. 5, 6, 7, and 8 represent details of several parts used in making up the invention.

The landside of the forward plow has its foot or lower edge rounded, so that it may be rocked to cause it to run out of the ground. With the forward plow and the axle connected by a bail hinged to the axle and extending the entire width of the carriage is connected a lever carrying a chain and a keeper, whereby the said plow can be readily raised from and lowered to the ground.
The rear plow is connected with the forward plow and with the bail and axle by a cross-head attached to the bail, a draw-rod, and a cross-bar, so that the said plows can be readily drawn.
With the axle-pin of the land-wheel and the arched main axle are connected a block carrying said axle-pin and working in guides which depend from the main axle, a standing rack-bar and its gear segment and lever, whereby the said land-wheel axle can be readily raised and lowered to level the machine.

$a'$ is the axle, upon one end of which is formed a journal, $a$, for the furrow-wheel T. The land-wheel T', which is made smaller than the furrow-wheel T, revolves upon the pin $a^2$, carried by the block $d'$.

It will be observed that the axle $a'$ is arched, the end carrying the furrow-wheel being simply turned downward at a right angle to the main portion of the axle, and the opposite end being bifurcated, also turned down and formed into two guides, $c'$, for the block $d'$. A rack-bar, $d$, is formed upon or attached to the upper side of the block $d'$, and a lever, W, having a segment-gear, $n$, formed upon or affixed to its lower end and, being pivoted to the framing above the block $d$, meshes with said rack-bar to level the machine. The lever W moves along a curved catch-bar, $e\ e'$, attached to the framing a little to one side of said lever, and with the teeth of which engages a spring-pawl connected with the lever, so that the lever W and its connections will be held securely in any position into which they may be adjusted.

The tongue D is secured to the axle $a'$ by clamps or other suitable means that will allow it to be adjusted to adapt the machine for use with two, three, or four horses, as circumstances may require. A brace-rod, U, extends from the inner side of the tongue to a plate, $c$, which connects the lower ends of the guides $c'$.

The plow P is placed in front of and close to the wheel T, so that the forward part of the said wheel will be between the mold-board and landside of the said plow, and so that the said wheel while running in the furrow opened by the plow will not be affected by clods and sods falling into the said furrow. The lower edge or foot of the landside of the plow P is rounded, as shown in Fig. 1, and to the forward part of said landside or to the lower part of the plow-beam G is attached the lower end of a chain, F, the upper end of which is attached to a pulley-segment, $g^2$, formed upon the lower end of a lever, E, which is pivoted upon the furrow axle-pin $a$. This pulley-segment is provided with a groove, $g'$, upon its circumference, for guiding the said chain. A bail, A, is pivoted at one end to the land-wheel axle-pin $a^2$, and, by means of a bar, H, which is bolted or otherwise affixed to its opposite end, it extends the entire width of the carriage, and also engages the furrow-wheel axle-pin $a$.

The bend of the forward plow-beam, G, is pivotally connected to the forward end of the bar H. A cross-head, $b$, to which the doubletrees should be attached, is fitted to the forward end, $f$, of the beam G, and a draft-rod, R, extends from the cross-head to a cross-head, A', adjustably located upon the bail A. Two lugs, $A^2$, depend from the body of the cross-head A', and a bolt, S, passes through an aperture in the lower end of each. The forward end of the beam $h$ is connected to the cross-head A' by means of said bolt, and a brace rod or bar, $h'$, attached to the beam $h$ some distance from its forward end, also engages the bolt S and serves to hold the plow in line. A number of apertures, $t'$, are formed in the lugs $A^2$, so that by shifting the bolt S the beam $h$ can be attached higher up on the said lugs, as desired. Several holes, $t$, are formed in the bail A, so that the cross-head A' may be shifted farther from or nearer to the furrow-wheel, to set the plow $P^2$ to take more or less land, as required.

For raising the plow $P^2$ from the ground we prefer to employ a link, J, having a fork at each end, and a bent foot-lever, K, which is formed of round iron by bending it once around the axle $a'$, as shown. The upper end of this lever is bent upward and outward to form a foot-piece, N, and its lower end engages the upper end of the link J. Now, it is obvious that by pressing down the foot-piece N of the lever K (the lower end of the link J being attached to the rear plow-beam, $h$, at its bend) the lever will be revolved upon the axle and the rear plow will be raised from the ground.

A curved lever, B, is rigidly attached by rivets or other suitable means to the beam G of the forward plow, and it extends rearwardly some distance beyond the axle $a'$. The rear end of the lever B is curved downwardly, beginning a short distance forward of the axle $a'$, to form an inclined surface, which is engaged by a U-shaped stirrup or keeper, L, carried by the lever E. If desirable, frictionrollers—such as $m$—may be placed within the said keeper to reduce the friction of the keeper sliding upon the lever B. In throwing the lever E forward one of the rollers $m$ will bear upon the upper edge of the curved lever B and so depress it as to run the plow P out of the ground, while by throwing the lever E backward one of the rollers $m$ will engage the lower edge of the curved lever, causing said plow to run deeper; but it may be observed that by throwing lever E back as far as it will go, as shown in Fig. 1, the chain F is tightened, and the plow P is lifted entirely out of the ground. With this construction, then, by moving the lever E forward a little, the curved lever B forces the heel of the landside downward, rocking the plow P upon the rounded foot of the landside and raising the point, causing the plow to run out of the ground.

When the forward plow has been raised from the ground, in the manner hereinbefore described, the upward movement of the said plow raises the bail A somewhat and thus raises the beam of the rear plow, $P^2$, causing the said plow to run out of the ground, when it can be raised from the ground by depressing the foot-piece N.

$c^2$ is the driver's seat, which is placed upon the axle $a'$ inside the tongue D, and its standard $c^3$ is attached to the axle by a clamp or other suitable means.

In Fig. 1 the chain F is represented of too great a length to raise the plow P very far from the ground, and to remedy this in practice it will only be necessary to hook up said chain a few links so as to make it somewhat shorter than shown.

Having thus described our invention, what we claim is—

1. In a combined sulky and gang plow, the combination, with the plow P, the bail A, having an extension, H, and the axle $a'$, of the rigid lever B, stirrup or keeper L, and lever E, carrying the grooved pulley $g^2$ at its lower end, and the chain F, substantially as herein shown and described, whereby the said plow can be readily raised from and lowered to the ground, as set forth.

2. In a combined sulky and gang plow, the combination, with the plows P $P^2$, the bail A, and the axle $a'$, of the adjustable cross-head A', the draw-rod R, and the brace rod or bar $h'$, substantially as herein shown and described, whereby the plows are connected with the carriage and can be readily drawn, as set forth.

3. In a sulky-plow, the combination, with the axle $a'$, having its land end bifurcated and turned downward to form the guides $c'$, of the block $d'$, fitted to work between said guides and carrying the land-wheel axle-pin $a^2$ and the land-wheel T', the lever W, its gear-segment $n$, and the standing rack-bar $d$, attached to said block, substantially as herein shown and described.

4. In a combined sulky and gang plow, the combination, with the axle $a'$, the bail A, and the beam G of the forward plow, attached to the front portion of said bail, of the lever E, carrying the keeper L, and the curved lever B, rigidly attached to said beam and engaging said keeper, substantially as herein shown and described, whereby said plow can be made to run deeper or shallower in the ground, as set forth.

In testimony whereof we affix our signatures in presence of two witnesses.

WILLIAM C. SCHENCK.
DANIEL R. SCHENCK.

Witnesses:
JNO. W. NORTON,
M. N. HIGDON.